United States Patent Office 3,493,400
Patented Feb. 3, 1970

3,493,400
DEHYDRATED PRECOOKED TOASTED ONION AND METHOD OF MAKING SAME
Herbert Truckenbrodt, Waltham, and Gerald M. Sapers, Framingham, Mass., assignors to Corn Products Company, New York, N.Y., a corporation of Delaware
No Drawing. Filed Oct. 29, 1965, Ser. No. 505,748
Int. Cl. A23b 7/02
U.S. Cl. 99—204                4 Claims

ABSTRACT OF THE DISCLOSURE

Particulate pieces of precooked foodstuff impregnated with sodium chloride are dehydrated to a moisture content of from 1% to 10% by weight. Precooked, subdivided onions impregnated with sodium chloride and monosodium glutamate are partially dehydrated to a moisture content of 5% to 20% and then toasted.

--- cally display an undesirable toughness and dryness which, although less marked than in air dried meats, are especially unacceptable in a higher priced quality product. The above-noted defects in the manufacturing economics and ingredient performance of dehydrated foods can be corrected in part by subjecting the fresh foods to prolonged cooking, freeze-thaw cycling, and impregnation with sugars, polyhydric alcohols, sequestering agents and other additives prior to dehydration and in part by using such a complex dehydration technique as puff-drying. However, by reason of ingredient performance, manufacturing economics or both, these preservative techniques have proved less than completely satisfactory to meet today's need for dehydrated precooked foodstuffs which possess the organoleptic properties of fresh cooked foods, which approach freeze dried precooked foods in reconstitution time, and which are economically competitive with air dried foods. The comparative performance and cost of some commercially available dehydrated foods are tabulated below:

| Ingredient | Piece size (in.) | Process | Reconstitution Time (min. at 212° F.) | Acceptability | Estimated relative cost |
|---|---|---|---|---|---|
| Carrot dices | 1/16 x 3/8 x 3/8 | Air dried | 12 | Fair | Low. |
| Do | 1/16 x 3/8 x 3/8 | Puff dried [2] | 3 | Good | Low. |
| Do | 1/8 x 1/2 x 1/2 | Air dried [2] | 6 | Fair | Expt'l. Prod. |
| Sweet garden peas | | do | 15 | Good | Low. |
| Do | | Freeze dried [2] | 2-3 | do | Moderate. |
| Green beans | Cross cut, 1" | Air dried | 12 | Fair | Do. |
| Do | do | Freeze dried [2] | 6 | Good | High. |
| Chicken [1] | 1/8 x 1/4 | Vacuum dried [2] | 10 | Poor | Moderate. |
| Do [1] | 3/8 x 3/8 | Freeze dried [2] | 2½ | Good | High. |

[1] Natural proportions.
[2] Precooked.

---

The present invention relates to preserved foodstuffs, and particularly to novel dehydrated precooked foodstuffs which reconstitute quickly and exhibit superior organoleptic properties, and to a novel and economic process for their preparation.

The art of preserving foodstuffs by dehydration has been advanced to a high degree of sophistication since its origin by the application of current knowledge in food science and engineering. Nevertheless, the special requirements for high quality, quick cooking, dehydrated foodstuffs created by today's convenience-oriented market have not been met in full by the techniques developed to date. Air convection drying, the least expensive of the conventional commercial dehydration techniques, generally results in dehydrated foods which reconstitute incompletely and slowly (e.g., about ten to twenty minutes in boiling water). Furthermore, such air dried foods upon reconstitution typically exhibit shriveling, color loss, textural deficiency (toughening) and alterations or losses in natural flavor. On the other hand, while freeze drying, one of the more expensive conventional commercial dehydration techniques, generally results in dehydrated foods which reconstitute completely and quite rapidly (e.g., less than six minutes in boiling water), the organoleptic properties of the reconstituted freeze dried foods are often markedly defective. Freeze dried meats, for example, typi- One object of the present invention is to provide novel dehydrated precooked foodstuffs which upon reconstitution possess substantially the organoleptic properties of fresh cooked foods.

An additional object is to provide novel dehydrated precooked foodstuffs in the form of slices, dices or cubes, which reconstitute rapidly and are suitable for use in convenience food products.

A further object is to provide novel dehydrated precooked vegetables which reconstitute in two minutes or less in boiling water and are economically competitive with air dried vegetables.

A further object is to provide novel freeze dried precooked fresh foods which upon reconstitution possess the tenderness of fresh cooked flesh foods.

Another obpect is to provide novel dehydrated precooked toasted onions which reconstitute in two minutes or less in boiling water and which upon reconstitution possess a desirable dark brown color and meatlike flavor, free from bitter notes.

Another object is to provide dehydrated food mixtures, such as dehydrated soups, stews and casseroles, composed of a powdered base mass and one or more novel dehydrated precooked foodstuffs.

An additional object of the present invention is to provide a novel and economic method for the preparation of the aforesaid novel dehydrated precooked foodstuffs and food mixtures.

Other objects and advantages of the present invention will become apparent from the following description.

In accordance with this invention, the novel dehydrated precooked foodstuffs are prepared by (1) precooking and impregnating 100 parts of the foodstuff with from 2 to 50 parts by weight of sodium chloride and (2) dehydrating the impregnated precooked foodstuff to a moisture content of from 1 to 10% based on the total weight thereof.

More specifically, the raw foodstuffs are cleaned, peeled, trimmed, deboned and otherwise prepared as needed for precooking by conventional procedures. Vegetables which are normally subdivided prior to cooking, for example cabbages, onions, carrots and the like, are subdivided by slicing, dicing, or cubing into foodstuff pieces. Meats may be subdivided in a similar manner, but usually into somewhat larger pieces and usually after the precooking step described below. While piece size will naturally vary with the form of each foodstuff, generally the foods are subdivided into pieces ⅛" to ½" thick and ¼" to 1" in width and length. With certain foods, for example green peas, subdividing will be unnecessary. To some degree the reconstitution time of the hydrated precooked foodstuff pieces will be dependent upon their size, it being well known, for example, that purees (which typically are prepared from a powdered mass, most of the individual particles of which would pass through a #10 U.S. Standard Sieve) reconstitute almost instantaneously. On the other hand, the raw foodstuffs in the present process are subdivided into relatively large pieces, generally larger than would be used for conventional air dehydration. Substantially all of these pieces would be retained by a #10 U.S. Standard Sieve. Subdivision of the foodstuffs is preferably done prior to the impregnation step to be described below.

Precooking of the foodstuffs may be carried out in any of the media customarily used in the art, including boiling water, steam at atmospheric or elevated pressures, and the like. The precooking time is, of course, a function of the characteristics of the food being cooked as well as the cooking procedure, and may vary from a few minutes in steam for leek to several hours in boiling water for beef, depending upon the cut, size, maturity, etc. of the food pieces. In all cases, the precooking should be continued for a period greater than the time required for conventional blanching (i.e., enzyme inactivation through heating) and equal to or slightly less than the time required to produce the characteristic appearance, texture and flavor of the fully cooked food. After precooking, the foodstuff may be cooled in order to increase its firmness and prevent flaking and falling apart.

In the impregnation step, 100 parts of the food are impregnated with from 2 to 50 parts by weight of sodium chloride. Preferably from 5 to 20 parts of sodium chloride are used, higher levels of sodium chloride being somewhat difficult to remove during reconstitution of the dehydrated food. As fresh foods generally contain not more than one half of one part of sodium chloride per 100 parts by weight of fresh food, and usually substantially less, for practical purposes the natural sodium chlorlide content of the foodstuffs may be ignored.

Impregnation, as the term is used herein, encompasses broadly the addition of the sodium chloride to the food not only by absorption, adsorption, entrapment and film-formation, but also through chemical reaction therewith. While the physical and chemical mechanisms of the present process are not fully understood and the precise reasons for the resultant advantages in the reconstitution time and organoleptic properties not ascertained with any certainty, several hypotheses have been proposed which may independently or in combination with other hypotheses account for the novel results.

According to one hypothesis, during the impregnation step the sodium chloride in solution enters the openings (e.g., the cellular pores, interstices and voids) of the foodstuff. During the subsequent dehydration step, the sodium chloride crystallizes within the foodstuff, thereby imparting supporting structure which inhibits shriveling and results in an open structure filled with crystals. Removal of the soluble sodium chloride from the foodstuff during the deconstitution step creates an open capillary structure and contributes substantially to the osmotic forces causing the water to migrate into the foodstuff, thereby reducing the time required for reconstitution.

According to another hypothesis, during the impregnation step an ion exchange reaction occurs between the sodium chloride and the foodstuff, monovalent sodium replacing divalent calcium and magnesium naturally found in foods. As these divalent cations create food-toughening networks by bridging or cross-linking the negatively charged carboxyl groups of proteins, pectins and other macromolecules found in foods, the replacement of the divalent cations by the monovalent sodium causes a breakdown of the natural macromolecular network and thereby increases the tenderness of the foodstuffs. As the resultant looser structure of the impregnated foodstuff has a higher water-binding capacity than the natural tight structure, increased tenderness and quicker reconstitution times are obtained. Consequently, these mechanisms tend to counteract the inherent toughening effect of the dehydration to which the foodstuff is later subjected. An advantageous by-product of this ion exchange reaction is the formation of the chlorides of calcium and magnesium, each of which is capable of binding water as a hydrate so that the water is unavailable for participation in undesirable chemical reactions.

The impregnation step is preferably accomplished by thoroughly mixing the foodstuff pieces with a suitable quantity of dry granular or crystalline sodium chloride for whatever period of time is required to achieve impregnation of the food with the desired amount of sodium chloride. Although mixing of the foodstuff pieces with crystalline sodium chloride is the preferred method of impregnation, the foodstuff pieces may also be impregnated with sodium chloride by other means, for example, by spraying the foodstuff pieces with an aqueous solution of sodium chloride or by immersing the foodstuff pieces in such a brine solution. The requisite spraying or immersion times will naturally vary with the porosity, size, cut, maturity of the food pieces, and the concentration and temperature of the solution. However, the immersion times required for impregnation of the food pieces with the desired sodium chloride levels generally do not exceed thirty minutes and may be as brief as two to five minutes. The solution concentration may be as high as saturation. The solution temperature may be room temperature or as high as the boiling point of the solution, although lower temperatures are generally preferred.

There are several reasons why immersion in brine at elevated temperatures, or for that matter brine cooking, is not preferred. First, a large portion of the nutritional and flavoring ingredients of foodstuffs are water soluble, and brine immersion will cause a substantial percentage of such valuable water soluble ingredients to be leached out of the food, thereby reducing both the flavor and nutritional value of the final food product. The extent of this undesirable leaching will, of course, increase with increasing brine concentration, brine temperature and immersion time. Furthermore, if the same brine solution is used for the immersion of successive batches of food, the leached-out ingredients may interact in the brine solution so as to introduce off-flavors or discolorations in later batches or provide a favorable medium for the growth of certain undesirable micro-organisms. Second, because even saturated brine solutions at elevated temperatures can contain only limited sodium chloride concentrations, about 26% by weight at room temperature, an effective upper limit is put on the sodium chloride concentration of the impregnated foodstuff.

The impregnated precooked foodstuff prepared as described above is then dehydrated by conventional procedures, typically air convection drying for vegetables and freeze drying for flesh foods, so that the final moisture content of the final dehydrated impregnated precooked food product is from 1% to 10% by weight, preferably from 1% to 5% by weight so that the dehydrated product is compatible with any other moisture-sensitive dehydrated foodstuffs with which it may be mixed. In order to reduce the period during which expensive freeze drying apparatus is utilized, and therefore improve the overall economic performance of the present process, particular foodstuffs such as the flesh foods may desirably be freeze dried only to moisture contents between 5 and 10% with further dehydration being done by air convection drying.

Whereas conventional dehydrated foodstuffs typically have sodium chloride contents substantially less than 1%, the preferred dehydrated foodstuffs produced by the present process have sodium chloride contents of from 8% to 75% based on the total weight thereof.

Conventional preservatives, stabilizers, flavorants such as monosodium glutamate and other permissible additives may be added to the foodstuffs at any suitable point during their preparation including the impregnation step. For example, antioxidants may be added to precooked meats during the impregnation step. Furthermore, the final products may be coated with commercially available fat mixtures or the like after dehydration to enhance their preservation.

The dehydrated impregnated precooked foodstuffs prepared in accordance with the process here disclosed are intended for consumption only after reconstitution, for example, by immersion in appropriate amounts of boiling water for the required period of time. In addition, the novel foodstuffs may be advantageously used as ingredients in food mixtures such as soups, stews and casseroles. Whether the powdered base of such a food mixture is home prepared or factory prepared, it usually contains a large amount of sodium chloride added purposely to produce the desired degree of flavor enhancement. In dehydrated food mixtures this extra salt is added as an ingredient of the powdered base. Whereas typically a factory prepared powdered base may have a sodium chloride content of up to 40% by weight, or even higher, the optimum salt level for the flavoring of soups, casseroles, stews and the like is probably from 1% to 1.5% on an "as eaten" weight basis. By entirely eliminating the sodium chloride usually used in the preparation of such a powdered base or at least reducing the quantity thereof in order to account for the sodium chloride which will be contributed by the dehydrated foodstuff, a mixture of an unsalted or at least undersalted powdered base and an oversalted foodstuff is obtainable which upon reconstitution in a predetermined quantity of water will provide a palatable salt level, preferably on the order of from 1% to 1.5% based on the total weight of the reconstituted soup, stew or casserole. In other words, the powdered base formula may simply be adjusted to compensate for the anticipated contribution of the sodium chloride from the dehydrated foodstuff. It is noted that, although in the present process the sodium chloride is introduced into the foodstuff for the purposes of achieving the desired improvements in reconstitution time and organoleptic properties, the salt also serves as a flavorant for the reconstituted food mixture. Therefore, to the extent the sodium chloride contained in the novel foodstuffs would otherwise have been included in the powdered base, no additional ingredient cost is incurred.

While the advantages of the present process may be realized to a varying degree in all dehydratable foodstuffs, the most marked improvements have been noted in vegetables and flesh foods, especially in the former.

Within the vegetable family, the present process has resulted in especial improvement in the foods of the generally recognized classes of bulbs (for example onions), fruits (for example green peppers), roots (for example carrots), shoots (for example asparagus), leaves and stems (for example cabbage and leek), flowers (for example cauliflower), and legumes (for example green beans and sweet garden peas). Although to a lesser degree, distinct improvements have also been noted in tubers such as potatoes. Such vegetables are preferably air dried according to the present process, the air dried product produced in accordance with the present process having a reconstitution time substantially the same as, or lower than, that of a similar product produced by the more expensive conventional freeze drying process.

Within the flesh food family, the present process has resulted in especial improvement in the foods of the generally recognized classes of meats (for example beef), poultry (for example chicken), and the like. Such flesh foods are preferable freeze dried according to the present invention, the freeze dried flesh food produced in accordance with the present process having organoleptic properties superior to those of a similar product produced by a conventional freeze drying process. Tenderness, juiciness and flavor are especially enhanced by the present process.

Another aspect of the present invetion is the discovery that toasted onions produced by the present invention possess a richer brown color, a meatier flavor free of bitterness, and a softer texture than were heretofore available. These advantages are obtained by precooking and impregnating 100 parts by weight of subdivided onions with about 2 to 5 parts of sodium chloride and about 1 to 3 parts of monosodium glutamate, for example, by mixing 5 parts of NaCl, 2 parts of MSG and 100 parts of precooked subdivided onions in a rotating drum; partially dehydrating the mixture to a moisture content of from about 5% to 20%, say in an air drier; then toasting the onions at a high temperature for a few minutes. If necessary, the toasted onions may be further dehydrated to a final moisture content of from 1% to 5% based on the total weight thereof, say by bin drying. The flavor and color developed by this process is believed to be the result of a Maillard-type reaction between the amino groups of the MSG and the carbonyl groups of the reducing sugars in onions.

In the examples given below to illustrate some of the specific embodiments of the present invention, the moisture contents, sodium chloride contents, and parts are on a weight basis unless otherwise indicated. Unless otherwise indicated, each control was reconstituted for two minutes in boiling water having the same salt content as would be produced by the dehydrated salted foodstuff for which it was a control. The various incidental process steps recited in particular examples such a lye peeling, sulfiting (whether or not in the presence of sodium carbonate or sodium bicarbonate), citric acid dipping, etc., are all conventional techniques described in Food Dehydration, vol. II, edited by Can Arsdel and Copley, Avi Publishing Co. (1964). Sodium chloride levels of the dehydrated salted products were determined as chloride by coulometric analyses. The retained salt levels on a fresh cooked basis were determined by similar analyses or, in some cases, by calculations based on the salt content of the dehydrated product and the moisture contents of the dehydrated and fresh cooked foods.

EXAMPLE 1

Leek precooked and salted

Fresh leek was washed, trimmed and cut into approximately ½ x ½ inch dices using an Urschel Model RA Dicer. The leek was precooked for 5 minutes in a steam blancher, cooled, and dipped in an 0.1% sodium sulfite solution for 3 minutes. After sulfiting, 20 parts of sodium chloride were mixed with 100 parts of leek for 5 minutes in a rotating drum. The salted leek and an unsalted precooked control were dehydrated in a cross draft air dryer for 8 hours at 140° F.

The dehydrated salted product had a moisture content of 2.9% and a sodium chloride content of 65.4% equivalent to a retained salt level of 19.4 parts of sodium chloride per 100 parts of fresh cooked leek.

After reconstituting for 2 minutes in boiling water, the salted product was superior to the control (reconstituted in salted water) in texture.

EXAMPLE 2

Leek precooked and brine dipped

Fresh leek was washed, trimmed, cut into approximately ½ x ½ inch dices, precooked for 5 minutes in a steam blancher and cooled. The dices were sulfited by immersion in a solution containing 0.1% sodium sulfite and 0.1% sodium bicarbonate for 3 mintes. After sulfitting, the leek was immersed in a saturated sodium chloride solution at 140° F. for 2 minutes. The brined leek and an unsalted precooked control were dehydrated in a cross draft air dryer for 20 hours at 140° F.

The dehydrated brined product had a moisture content of 4.2% and a sodium chloride content of 46.1%, equivalent to a retained salt level of 7.6 parts of sodium chloride per 100 parts of fresh cooked leek.

After reconsittuting for 2 minutes in boiling water, the brined product was superior to the unsalted control (reconstituted in salted water) in appearance, flavor, and texture.

EXAMPLE 3

Leek precooked and brine sprayed

Fresh leek was diced, precooked and sulfited as described in Example 1. The sulfited leek was sprayed with saturated sodium chloride at 140° F. until the surfaces of the dices were completely wetted. The brine-sprayed leek and an unsalted precooked control were dehydrated in a cross draft air dryer for 20 hours at 140° F.

The dehydrated brined product had a moisture content of 3.8% and a sodium chloride content of 65.3%, equivalent to a retained salt level of 22.8 parts of sodium chloride per 100 parts of fresh cooked leek.

After reconstituting for 2 minutes in boiling water, the salted product was superior to the unsalted control (reconstituted in salted water) in appearance, texture, and flavor.

EXAMPLE 4

Leek brined and precooked

Fresh leek was washed, trimmed and cut into approximately ½ x ½ inch dices using an Urschel Model RA Dicer. The leek was immersed in a satuated sodium chloride brine at 70° F. for 10 minutes, cooked in a steam blancher for 10 mintues and dehydrated in a cross draft air dryer for 8 hours at 140° F.

The brined sample had a moisture content of 3.3% and a sodium chloride content of 45.9%, equivalent to a retained salt level of 9.2 parts of sodium chloride per 100 parts of raw leek.

After 2 minutes reconstitution in boiling water, the salted product was superior to an unsalted control (reconstituted in fresh water) in texture and in flavor.

EXAMPLE 5

Carrot precooked and salted

California Imperator carrots were trimmed, lye peeled in a boiling 5% sodium hydroxide solution for 2½ minutes, washed and sliced to ⅛ inch cross cuts using a Hobart slicer. The carrot cross cuts were precooked for 15 minutes in a steam blancher. After cooling, 50 parts of sodium chloride were mixed with 100 parts of cross cuts in a rotating drum for 5 minutes. The salted carrots and an unsalted precooked control were dehydrated in a cross draft air dryer for 8 hours at 140° F.

The dehydrated salted product had a moisture content of 2.9% and a sodium chloride content of 74.9%, equivalent to a retained salt level of 41.5 parts of sodium chloride per 100 parts of fresh cooked carrots.

After reconstituting for 2 minutes in boiling water, the salted product was more tender and less shriveled than the unsalted control (reconstituted in salted water).

EXAMPLE 6

Carrot precooked, salted and washed

Carrots were peeled, sliced, precooked, sulfited and salted as described in Example 5. The salted slices were then sprayed with cold water to remove excess salt. The salted and washed carrot cross cuts were dehydrated in a cross draft air dryer for 8 hours at 140° F.

The dehydrated salted product had a moisture content of 5.1% and a sodium chloride content of 41.2% (as compared to 73% for an unwashed sample), equivalent to a retained salt level of 9.5 parts of sodium chloride per 100 parts of fresh cooked carrots.

After reconstituting in boiling water for 2 minutes, the washed salted carrot slices containing 41.2% sodium chloride were found to be equivalent in appearance, texture and flavor to the salted slices containing 73% salt.

EXAMPLE 7

Carrot salted and precooked

Carrots were trimmed, lye peeled, washed and cut into ½ x ½ x ⅛ inch dices with an Urschel Model RA Dicer. The carrots were mixed with 10 parts sodium chloride per 100 parts of dices in a PK Twin Shell Blender for 8 minutes. After salting, the dices were precooked in a steam blancher for 15 minutes and dehydrated in a cross draft air dryer.

The dehydrated salted product had a moisture content of 5.2% and a sodium chloride content of 51.2%, equivalent to a retained salt level of 8.4 parts of sodium chloride per 100 parts of raw carrots.

After 2 minutes reconstitution in boiling water the salted carrots were more tender than an unsalted control (reconstituted in fresh water).

EXAMPLE 8

Carrot brine cooked

California Imperator carrots were trimmed, lye peeled, washed and sliced as in Example 5. The carrots were precooked in a boiling sodium chloride solution (20 g. salt/ 100 cc. solution) for 5 minutes, cooled and dehydrated in a cross draft air dryer at 140° F. for 16 hours. An unsalted control was cooked in boiling water for 12 minutes by which time it was as tender as the brine-cooked sample.

The dehydrated brine-cooked product had a moisture content of 5.9% and 49.3% sodium chloride, equivalent to a salt level of 13.5 parts of sodium chloride per 100 parts of fresh cooked carrots.

After reconstituting for 2 minutes in boiling water, the brine-cooked product was superior to the unsalted control (reconstituted in salted water) in appearance and texture.

EXAMPLE 9

Cabbage precooked and salted

Savory cabbage was washed and shredded into approximately 1 x 1 inch dices. The dices were precooked for 10 minutes in a steam blancher and sulfited by immersion in an 0.1% sulfur dioxide solution for 30 seconds. After sulfiting, 5 parts of sodium chloride were mixed with 95 parts of cabbage and an unsalted precooked control were dehydrated for 16 hours at 140° F. in a cross draft air dryer.

The dehydrated salted product had a moisture content of 6.4% and a sodium chloride content of 38.8%, equivalent to a retained salt level of 4.8 parts of sodium chloride per 100 parts of fresh cooked cabbage.

After reconstituting in boiling water for 2 minutes, the salted product was more tender than the unsalted control (reconstituted in salted water).

EXAMPLE 10

Green beans precooked and salted

Green beans were washed and cut French style to approximately ½ inch pieces. The beans were precooked in a steam blancher for 12 minutes and then sulfited for one minute in an 0.1% sulfur dioxide solution. After sulfiting, 5 parts of sodium chloride were mixed with 100 parts of beans for 5 minutes in a rotating drum. The salted beans and an unsalted precooked control were dehydrated in a cross draft air dryer for 18 hours at 140° F.

The dehydrated salted product had a moisture content of 4.4% and a sodium chloride content of 32.6%, equivalent to a retained salt level of 4.8 parts of sodium chloride per 100 parts of fresh cooked beans.

After reconstituting in boiling water for 2 minutes, the salted product was superior to the unsalted control (reconstituted in salted water) in flavor and texture.

EXAMPLE 11

Green pepper precooked and salted

Green garden peppers were trimmed, sliced into ½ x ½ inch slices and washed to remove adhering seeds. The slices were dipped in an 0.1% sodium sulfite solution (also containing 0.1% sodium carbonate) for 3 minutes and precooked in a steam blancher for 10 minutes. After cooking 20 parts of sodium chloride were mixed with 100 parts of pepper slices for 5 minutes in a rotating drum. The salted slices and an unsalted precooked control were dehydrated at 140° F. for 20 hours in a cross draft air dryer.

The dehydrated salted product had a moisture content of 4.6% and a sodium chloride content of 59.0%, equivalent to a retained salt level of 8.1% parts of sodium chloride per 100 parts of fresh cooked pepper.

After reconstituting for two minutes in boiling water, the salted product was superior to the unsalted control (reconstituted in salted water) in color, flavor, and texture.

EXAMPLE 12

Onion precooked and salted

Yellow Globe onions were peeled, trimmed and sliced, the rings being subdivided into ¼ x 1 inch pieces. The pieces were precooked for 10 minutes in a steam blancher, cooled and dipped in a 0.1% sulfur dioxide solution for one minute. After sulfiting, 5 parts of sodium chloride were mixed with 100 parts of onion pieces for 5 minutes in a rotating drum. The salted onions and an unsalted precooked control were dehydrated in a cross draft air dryer for 16 hours at 140° F.

The dehydrated salted product had a moisture content of 4.4% and a sodium chloride content of 35.5%, equivalent to a retained salt level of 3.2 parts of sodium chloride per 100 parts of fresh cooked onions.

After reconstituting for 2 minutes in boiling water, the salted product was superior to the unsalted control (reconstituted in salted water) in flavor and tenderness.

EXAMPLE 13

Pea precooked and salted

Commercially frozen sweet garden peas were thawed and size graded through a ⅜ inch screen, the larger peas being discarded. The smaller peas were pricked, precooked for 15 minutes in a steam blancher, cooled, and separated in a 10% sodium chloride solution into "sinkers" and "floaters," the "sinkers" being discarded. The "floaters" were sulfited by dipping in an 0.2% sodium sulfite solution for one minute. After sulfiting, 15 parts of sodium chloride were mixed with 100 parts of peas for 5 minutes in a rotating drum. The salted peas and an unsalted precooked control were then dehydrated at 140° F. for 20 hours in a cross draft air dryer.

The dehydrated salted product contained 5.7% moisture and 45.4% sodium chloride, equivalent to a retained salt level of 14.9 parts of sodium chloride per 100 parts of fresh cooked peas.

After reconstituting for 2 minutes in boiling water, the salted product was superior to the unsalted control (reconstituted in salted water) in tenderness.

EXAMPLE 14

Cauliflower precooked and salted

Cauliflower florets were washed and subdivided into quarters approximately ½ x ½ x ½ inch. The pieces were precooked in a steam blancher for 8 minutes and then dipped in a solution containing 0.1% sulfur dioxide for 1 minute. After sulfiting, 5 parts of sodium chloride were mixed with 100 parts of cauliflower pieces for 5 minutes in a rotating drum. The salted cauliflower and an unsalted precooked control were dehydrated in a cross draft air dryer at 140° F. for 20 hours.

The dehydrated salted product contained 5.0% moisture and 23.8% sodium chloride, equivalent to a retained salt level of 2.3 parts sodium chloride per 100 parts fresh cooked cauliflower.

After reconstituting in boiling water for 2 minutes, the salted product had better color and was less shriveled than the unsalted control (reconstituted in salted water).

EXAMPLE 15

Potato precooked and salted

California Sebago potatoes were lye peeled in 25% sodium hydroxide for 5 minutes at 160° F., washed with water, dipped in 0.5% citric acid for one minute, and cut into ⅛ x ½ x ½ inch dices. The dices were precooked for 5 minutes in a steam blancher, cooled and immersed in a 0.1% sulfur dioxide solution for one minute. After sulfiting, 5 parts of sodium chloride were mixed with 100 parts of potato dices for 5 minutes in a rotating drum. The salted dices and an unsalted precooked control were dehydrated for 20 hours at 140° F. in a cross draft air dryer.

The dehydrated salted product contained 5.4% moisture and 23.1% sodium chloride, equivalent to a retained salt level of 4.8 parts of sodium chloride per 100 parts of fresh cooked potato.

After 2 minutes reconstitution in boiling water, the salted product was preferable to the unsalted control (reconstituted in salted water) in appearance, flavor and texture.

EXAMPLE 16

Beef precooked and salted

Choice top round beef was trimmed, precooked in boiling water for 2 hours, cooled and cut into approximately ½ inch cubes. Three parts of sodium chloride and one part of monosodium glutamate were mixed with 100 parts of beef cubes for 5 minutes in a rotating drum. The salted cubes and an unsalted precooked control were then blast frozen at −40° F. The frozen cubes were placed on trays and freeze dried in a chamber evacuated to less than 0.3 mm. Hg, the heat of sublimation being supplied by radiation from plates maintained at a temperature of from 300° F. initially to 130° F. at the end of a 6 hour drying cycle. The dehydrated beef was fat coated by immersion in melted hydrogenated peanut oil for 2 minutes followed by draining and centrifugation in a basket centrifuge to remove the excess oil.

The dehydrated salted product contained 1.7% moisture and 9.7% sodium chloride, equivalent to a retained salt level of 2.7 parts of sodium chloride per 100 parts of fresh cooked beef.

After reconstituting for 2 minutes in boiling water, the salted product was more tender and juicy than the unsalted control (reconstituted in salted water).

EXAMPLE 17

Chicken precooked and salted

Chicken breasts were washed, trimmed, precooked in boiling water for 1 hour, cooled, deboned and cut into approximately ½ inch cubes. Four parts of sodium chloride and one part of monosodium glutamate were mixed with 100 parts of cubed white meat for 5 minutes in a rotating drum. After salting, the cubes were blast frozen at −40° F. and placed on trays. The cubes were freeze-dried and fat coated by the same procedure described in Example 17.

The dehydrated salted chicken contained 2.0% moisture and 9.8% sodium chloride, equivalent to a retained salt level of 3.9 parts of sodium chloride per 100 parts of fresh cooked chicken.

After 2 minutes reconstitution in boiling water, the salted product was more juicy than the unsalted control (reconstituted in water containing salt and monosodium glutamate).

EXAMPLE 18

Toasted onion precooked and salted

Spanish onions were peeled, trimmed and diced with an Urschel Dicer Model RA, yielding approximately ¼ x ½ inch pieces. The onion dices were precooked for 9 minutes in a steam blancher. After cooling, 5 parts of sodium chloride and 2 parts of monosodium glutamate were mixed with 100 parts of onion dices for 5 minutes in a rotating drum. The salted onions and an unsalted precooked control were partially dehydrated in a cross draft air dryer for 1½ hours at 176° F., 1½ hours at 160° F., and 1½ hours at 140° F. by which time the moisture content was reduced to 10.4%. The partially dehydrated onions were toasted in a cross draft air dryer at 300° F. for seven minutes and were then bin dried at 120° F. for 16 hours.

The final dehydrated product had a moisture content of 3.92% and a sodium chloride content of 28.2%, equivalent to a retained salt level of 2.9 parts of sodium chloride per 100 parts of fresh cooked onions.

After 2 minutes reconstitution in boiling water, the salted onions were found to be superior to the unsalted control (reconstituted in salted water), having a richer brown color, a meatier flavor free from bitterness and a softer texture.

EXAMPLE 19

Vegetable beef soup

A quick cooking dehydrated vegetable beef soup was prepared using a conventional soup formula which was modified by substituting novel vegetable and beef pieces for conventional ingredients at equivalent levels on a salt free basis and by adjusting the sodium chloride and monosodium glutamate content of the dry mix accordingly. The composition of the conventional and novel soups are summarized below:

| Ingredient | Level in dry soup (Percent) | |
|---|---|---|
| | Conventional | Novel |
| Dehydrated vegetable blend (g.) | [1] (9.66) | [1] (16.00) |
| Onion slices | 15.53 | 14.81 |
| Carrot slices | 15.53 | 19.86 |
| Leek flakes | 7.76 | 8.93 |
| String beans | 10.35 | 9.37 |
| Green peas | 5.18 | 6.06 |
| Potato dices | 25.88 | 20.77 |
| Cabbage flakes | 5.18 | 5.44 |
| Cauliflower dices | 10.35 | 9.20 |
| Green pepper dices | 3.10 | 4.87 |
| Parsley (conventional) | 1.14 | 0.69 |
| | 100.00 | 100.00 |
| Meat pieces (g.) | [1] (3.50) | [1] (3.76) |
| Beef | 71.43 | 73.40 |
| Hydrogenated veg. oil | 28.57 | 26.60 |
| | 100.00 | 100.00 |
| Dry mix (g.) | [1] (28.76) | [1] (22.36) |
| Starch | 43.84 | 56.39 |
| Sodium chloride | 21.90 | 0 |
| Beef fat | 9.80 | 12.60 |
| Beef extract | 8.69 | 11.18 |
| Monosodium glutamate | 7.93 | 9.75 |
| Hydrolyzed vegetable protein | 3.40 | 4.38 |
| Spice mix | 1.49 | 1.91 |
| Tomato powder | 2.95 | 3.79 |
| Total ingredients (g.) | 100.00 [1] (41.92) | 100.00 [1] (42.12) |

[1] The weights of ingredient classes in a package of dry soup mix are given in parentheses. The contents of one package are reconstituted in three cups of water.

The reconstitution time in boiling water of the conventional vegetable beef soup mix is approximately 15 minutes, while the novel vegetable beef soup mix may be reconstituted in two minutes.

The conventional soup mix is based on a modification of a formula described by John H. Nair in Food Dehydration, supra p. 455.

While the above processes and products are presently deemed the preferred embodiments of the present invention, it will be obvious to those skilled in the art that there are other changes and modifications which may be made without departing from the inventive concept. For instance, commercial embodiments of the present process may utilize a brine cooking step for reasons of economy despite the theoretical disadvantages of brine cooking noted above. Accordingly, the appended claims are intended to cover all such changes and modifications that fall within the true spirit and scope of the invention therein defined.

1. A process for the preparation of dehydrated precooked toasted onions having a reconstitution time of not more than 2 minutes in boiling water comprising the steps of:
   (1) peeling, trimming and subdividing said onions into onion pieces;
   (2) preparing 100 parts of precooked onion pieces impregnated with from 2 to 5 parts of sodium chloride and from 1 to 3 parts by weight of monosodium glutamate;
   (3) partially dehydrating the product to a moisture content of from 5% to 20%;
   (4) toasting said partially dehydrated product to produce desirable color and flavor therein.

2. The process of claim 1 wherein said toasted product is further dehydrated to a final moisture content of from 1% to 5%.

3. The process of claim 1 wherein said partially dehydrated product is toasted in air having a temperature of from 200 to 350° F., for 2 to 15 minutes to produce therein a dark brown color and a meaty flavor free of bitterness.

4. Dehydrated precooked toasted onions produced by the method of claim 1.

References Cited

UNITED STATES PATENTS

| | | | |
|---|---|---|---|
| 2,565,942 | 8/1951 | Barsky et al. | 99—204 X |
| 2,657,999 | 11/1953 | Rauch | 99—204 |
| 2,705,679 | 4/1955 | Griffiths et al. | 99—207 |
| 2,797,166 | 6/1957 | Siciliano et al. | 99—207 |
| 3,098,750 | 7/1963 | Prater et al. | 9—204 |
| 3,281,251 | 10/1966 | Templeton | 99—204 |

FOREIGN PATENTS

| | | |
|---|---|---|
| 940,003 | 10/1963 | Great Britain. |
| 2,456 | 6/1926 | Australia. |

A. LOUIS MONACELL, Primary Examiner

STEPHEN B. DAVIS, Assistant Examiner

U.S. Cl. X.R.

99—199, 207, 208